United States Patent
Garcia et al.

(10) Patent No.: US 9,115,502 B2
(45) Date of Patent: Aug. 25, 2015

(54) FRAME FOR SUPPORTING AND CALIBRATING A PEDESTAL, PREFERABLY FOR A HELIOSTAT

(75) Inventors: Francisco Cerón Garcia, Sevilla (ES); Emiliano Cornago Ramírez, Sevilla (ES)

(73) Assignee: Abengoa Solar New Technologies S.A., Sevilla (ES)

( * ) Notice: Subject to any disclaimer, the term of this patent is extended or adjusted under 35 U.S.C. 154(b) by 879 days.

(21) Appl. No.: 13/387,351

(22) PCT Filed: Jul. 26, 2010

(86) PCT No.: PCT/ES2010/070516
§ 371 (c)(1),
(2), (4) Date: Mar. 22, 2012

(87) PCT Pub. No.: WO2011/012757
PCT Pub. Date: Feb. 3, 2011

(65) Prior Publication Data
US 2012/0174912 A1 Jul. 12, 2012

(30) Foreign Application Priority Data

Jul. 28, 2009 (ES) .................................. 200930521

(51) Int. Cl.
*E04G 13/00* (2006.01)
*E04G 21/18* (2006.01)
*F24J 2/52* (2006.01)

(52) U.S. Cl.
CPC .............. *E04G 13/00* (2013.01); *E04G 21/185* (2013.01); *E04G 21/1841* (2013.01); *F24J 2/523* (2013.01);
(Continued)

(58) Field of Classification Search
CPC ... E04G 21/18; E04G 21/1841; E04G 21/185; E04G 13/00; E04H 12/22; E02D 27/42; A47G 33/12; A47G 33/1206; A01G 19/12; A01G 17/04; A01G 17/14; F24J 2/523; F24J 2/525; F24J 2002/5281; F24J 2002/5292; Y02E 10/47
USPC ......... 264/32, 35; 33/520, 562; 269/111, 118, 269/119, 121; 47/40.5, 42, 43; 52/296, 297
See application file for complete search history.

(56) References Cited

U.S. PATENT DOCUMENTS 515,026 A * 2/1894 Schleicher .................... 269/118
626,514 A * 6/1899 Wagner .......................... 47/40.5
(Continued)

FOREIGN PATENT DOCUMENTS

| FR | 2481726 | 11/1981 |
|---|---|---|
| FR | 2752860 | 3/1998 |
| JP | 2005090116 | 4/2005 |

OTHER PUBLICATIONS

PCT International Search Report mailed Oct. 18, 2010, PCT Apln. No. PCT/ES2010/070516 filed Jul. 26, 2010 (3 pages).

*Primary Examiner* — Michael Safavi
(74) *Attorney, Agent, or Firm* — Blakely Sokoloff Taylor & Zafman LLP

(57) ABSTRACT

It facilitates the foundation and assembling of the pedestal (15) on the ground, allowing calibration of its verticality and azimuthal orientation, further serving as a formwork element. Said frame comprises a quadrangular structure (1), articulated in at least one of its corners, preferably two, and adapted to surround the pedestal (15), which is provided with four horizontal profiles (2); calibration bolts (5) through which the pedestal (15) is pressed and adjusted in a vertical position; with said bolts (5) being inserted into nuts (4), which are connected to vertical bodies (3) linked to the profiles (2); and plates (7) linked to those profiles (2) which feature holes (8) through which picks (9) are vertically inserted, designed to be nailed to the ground for fixation and stability of the frame.

8 Claims, 4 Drawing Sheets

(52) U.S. Cl.
CPC .......... *F24J 2/525* (2013.01); *F24J 2002/5281* (2013.01); *F24J 2002/5292* (2013.01); *Y02E 10/47* (2013.01)

(56) References Cited

U.S. PATENT DOCUMENTS

| | | | | |
|---|---|---|---|---|
| 1,401,144 A * | 12/1921 | Dicks | | 248/523 |
| 1,549,959 A * | 8/1925 | Berman | | 248/524 |
| 1,811,918 A * | 6/1931 | Danner | | 47/40.5 |
| 2,014,896 A * | 9/1935 | Hollander | | 248/525 |
| 2,159,760 A * | 5/1939 | Fitzgerald | | 248/524 |
| 2,277,803 A * | 3/1942 | Varner | | 248/524 |
| 2,469,192 A * | 5/1949 | Bouc | | 248/527 |
| 2,485,819 A * | 10/1949 | Doebling | | 248/527 |
| 2,815,908 A * | 12/1957 | Scanland | | 47/40.5 |
| 3,329,380 A * | 7/1967 | Graves et al. | | 47/40.5 |
| 3,423,082 A * | 1/1969 | Reyner | | 269/104 |
| 4,286,409 A * | 9/1981 | Taylor et al. | | 47/40.5 |
| 4,801,123 A * | 1/1989 | Lynch | | 248/524 |
| 4,848,027 A * | 7/1989 | Skierwiderski | | 47/42 |
| 5,002,252 A * | 3/1991 | Setala et al. | | 248/533 |
| 5,111,611 A * | 5/1992 | Elder | | 47/40.5 |
| 5,209,450 A * | 5/1993 | Grapes | | 248/523 |
| 5,551,662 A * | 9/1996 | Keady | | 249/51 |
| D381,930 S * | 8/1997 | Faller | | D11/130.1 |
| 5,743,508 A * | 4/1998 | Fiveash | | 248/527 |
| 5,816,568 A * | 10/1998 | Fox | | 269/60 |
| 6,286,804 B1 * | 9/2001 | Avinger et al. | | 248/523 |
| 6,299,124 B1 * | 10/2001 | Reback et al. | | 248/519 |
| 6,371,432 B1 * | 4/2002 | Tsappi | | 248/523 |
| 6,684,580 B1 * | 2/2004 | Hull | | 52/170 |
| 6,708,418 B1 * | 3/2004 | Schaefer | | 33/518 |
| 7,600,342 B2 * | 10/2009 | Fiveash | | 47/40.5 |
| 7,877,889 B2 * | 2/2011 | Griffin, Jr. | | 33/562 |
| 8,276,871 B1 * | 10/2012 | DeRienzo | | 248/521 |
| 8,490,328 B1 * | 7/2013 | Glover | | 47/40.5 |
| 8,646,232 B2 * | 2/2014 | Liskey | | 52/295 |
| 8,671,613 B2 * | 3/2014 | Crilly et al. | | 47/40.5 |
| 2002/0078624 A1 * | 6/2002 | Saxon et al. | | 47/42 |
| 2002/0088172 A1 * | 7/2002 | Nosker | | 47/42 |
| 2008/0035831 A1 * | 2/2008 | Rodin | | 249/25 |
| 2010/0019119 A1 * | 1/2010 | Hebert | | 248/521 |
| 2014/0373440 A1 * | 12/2014 | Niklaus | | 47/40.5 |

\* cited by examiner

FRAME FOR SUPPORTING AND CALIBRATING A PEDESTAL, PREFERABLY FOR A HELIOSTAT

CROSS-REFERENCE TO RELATED APPLICATIONS

The present patent application is a national phase application of International Application No. PCT/ES2010/070516, filed Jul. 26, 2010, which application claims priority to Spanish Application No. P 200930521, filed Jul. 28, 2009.

FIELD OF THE INVENTION

The present invention is especially applicable to the field of renewable energies, and preferably, for the installation of heliostats designed for solar energy concentration.

The main object of the present invention is a frame that facilitates foundation and assembling of the pedestal above ground of, for example, a heliostat, allowing calibration of its verticality and its azimuthally orientation, further serving as a formwork element.

BACKGROUND OF THE INVENTION

With the growing use of renewable energies, solar energy is one of the sources of energy with a fastest expansion. Tower thermoelectric solar plants are formed by a field of heliostats or mirrors of large dimensions (40 to 120 m$^2$) mounted over a structure or frame leaning on arms which at the same time rest on a pedestal. Those arms feature a motor which allows the heliostat to execute an azimuthal and elevation movement in order to adequately position it so that the rays reflected by the heliostats continuously reach a single focus located on top of a tower.

In turn, for the support of the tracker's structure, there is a foundation composed of reinforced concrete partially grounded. Since the structure must stand great pressures, mostly due to the weight of the heliostat, and especially to the strength of the wind over its surface, said foundation usually features large dimensions in order to withstand the great efforts to which it will be subjected.

Currently, this foundation has the shape of pillars which are manufactured on site pouring concrete into a mold which later forges, creating a solid concrete pillar. Another way to carry out the foundation work of the pedestal is through the insertion of concrete blocks into the stand later filling it with a large amount of mortar. These processes are slow and costly, and do not meet the current need for more efficient, faster and cheaper processes.

SUMMARY OF THE INVENTION

Through the present invention, a tool for fixation and calibration of pedestals, preferably of heliostats is provided, with which it is possible to maintain it in a vertical position, further acting as a formwork element, using a notably lower amount of concrete as compared with the old foundation systems.

To that end, the creation of a trench to introduce the pedestal's base is proposed, and with the help of the frame object of the invention, the pedestal is positioned in the appropriate orientation, controlling its verticality to subsequently fill the trench with concrete, with the frame serving as a framework element. Preferably the pedestal's base is placed in the trench over a concrete beam to avoid potential rusting of the pedestal.

The frame for fixation and calibration of a pedestal, object of the present invention, comprises a quadrangular structure, preferably made of steel, articulated in at least one of its corners, preferably in two, and adapted to surround the pedestal. Said structure comprises four horizontal profiles, which preferably display a U-shaped configuration with its branches pointing outwards, which present vertical bodies in their mid-area provided with nuts through which horizontal calibration bolts are inserted and through which the pedestal is fixed in a vertical position, thus enabling its adjustment and regulation.

These bolts feature a manual tightening element in their outer end, so that their rotation enables them to press the pedestal. Preferably one of the horizontal bolts is positioned in a northbound direction, and it is forced to coincide with a mark engraved on the corresponding pedestal with the adequate orientation to be achieved.

Furthermore, for the correct fixation of the frame to the ground, two of the previously mentioned profiles have plates which feature holes through which picks are inserted vertically, designed to be nailed to the ground. Preferably, the profiles containing the plates are located facing each other to provide for a better fixation of the frame to the ground. On the other hand, the picks have attachment elements on their upper end to be manually nailed to the ground.

For the closure of the articulated structure, there are preferably hollow tubes welded to two of the profiles, with the two remaining profiles containing openings, which coincide with said tubes, through which latches are vertically inserted which preferably feature an inverted-L shape.

Furthermore, in order to eliminate dangerous sharp edges, once the concrete is forged and dry, the structure additionally comprises joints located in the inner sides of the profile's corners.

Through the frame for fixing a pedestal described herein, a considerable improvement is obtained in the foundation process of the pedestals, constituting a dual-purpose tool, on the one hand, the pedestal is adjusted and calibrated in the adequate position, and on the other hand, it acts as a formwork element, with the related saving in time and economic cost of the construction work.

Likewise, through this frame the installation of the pedestal is thus facilitated, which is lifted preferably with a crane that is tied to the pedestal's upper bridle, carrying out the pedestal's position adjustment in orientation and in verticality of said pedestal through the frame of the invention.

BRIEF DESCRIPTION OF THE DRAWINGS

To complement the description being made and in order to help better understand the features of the invention, according to a preferred practical embodiment thereof, a set of drawings is attached as an integral part of said description, wherein the following is shown as way of illustration but not limited to.

DETAILED DESCRIPTION OF THE INVENTION

Figure 1:
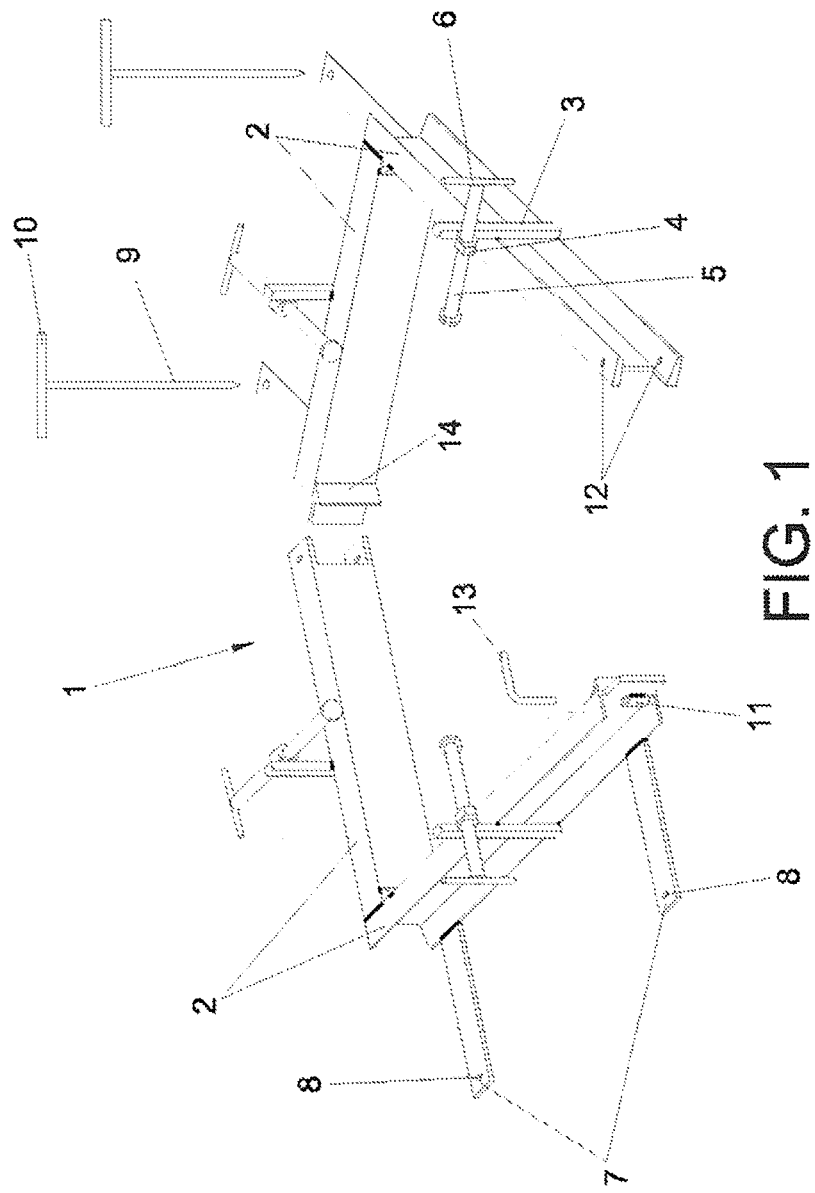
FIG. 1.— Shows a perspective view of the frame for fixation of a pedestal when it is taken apart.

As it may be seen in the referenced drawings, the frame for fixing a pedestal comprises a quadrangular structure (1) made of steel, articulated in two of its corners and adapted to surround the pedestal (15). Said structure (1) comprises four horizontal profiles (2) with a U-shaped configuration and their branches pointed outwards, which present vertical bodies (3) in their mid-area provided with nuts (4) through which four horizontal calibration bolts (5) are inserted, which press and adjust the pedestal (15) in a vertical position.

Figure 2:
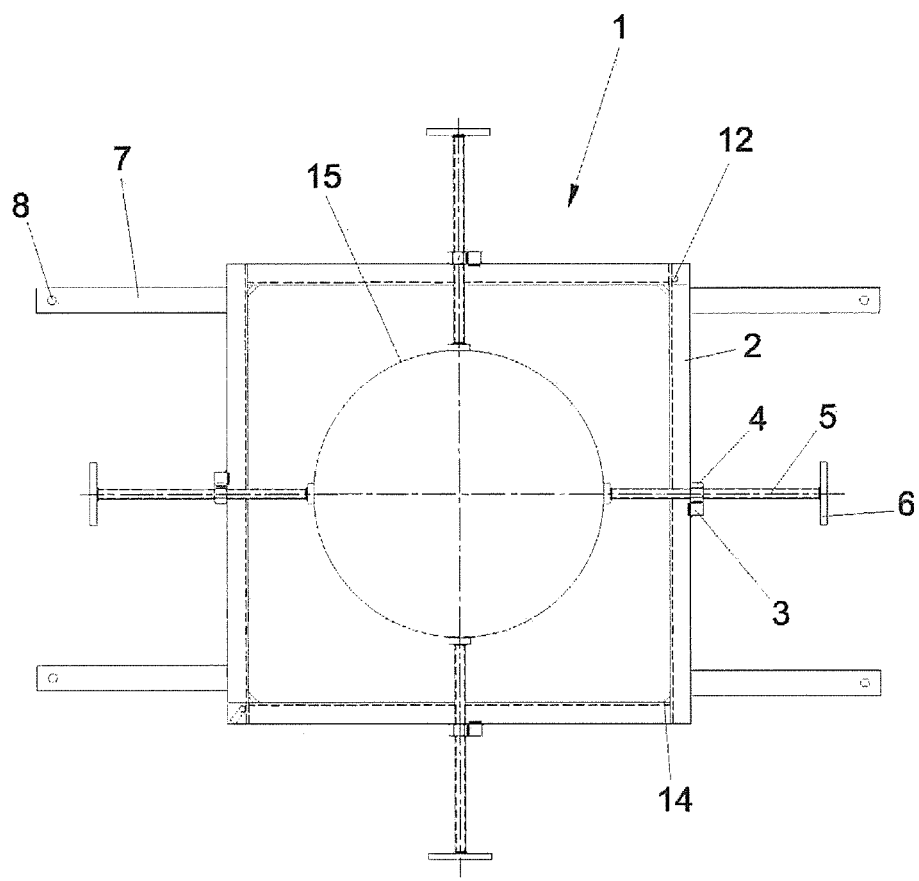
FIG. 2.— Shows a plan view of the frame for fixation of a pedestal object of the invention, once assembled around the stand.
Figure 3:
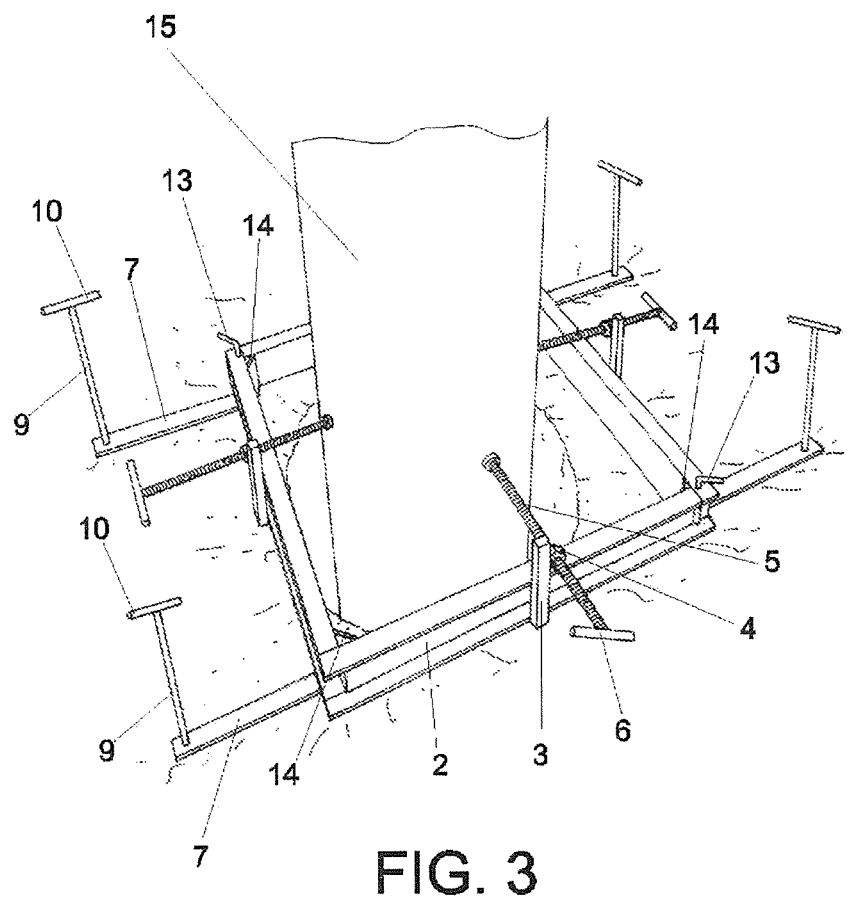
FIG. 3.— Shows a perspective view of the frame object of the invention with the bolts pressing the pedestal to keep its verticality in the trench, before being filled with concrete.
Figure 4:
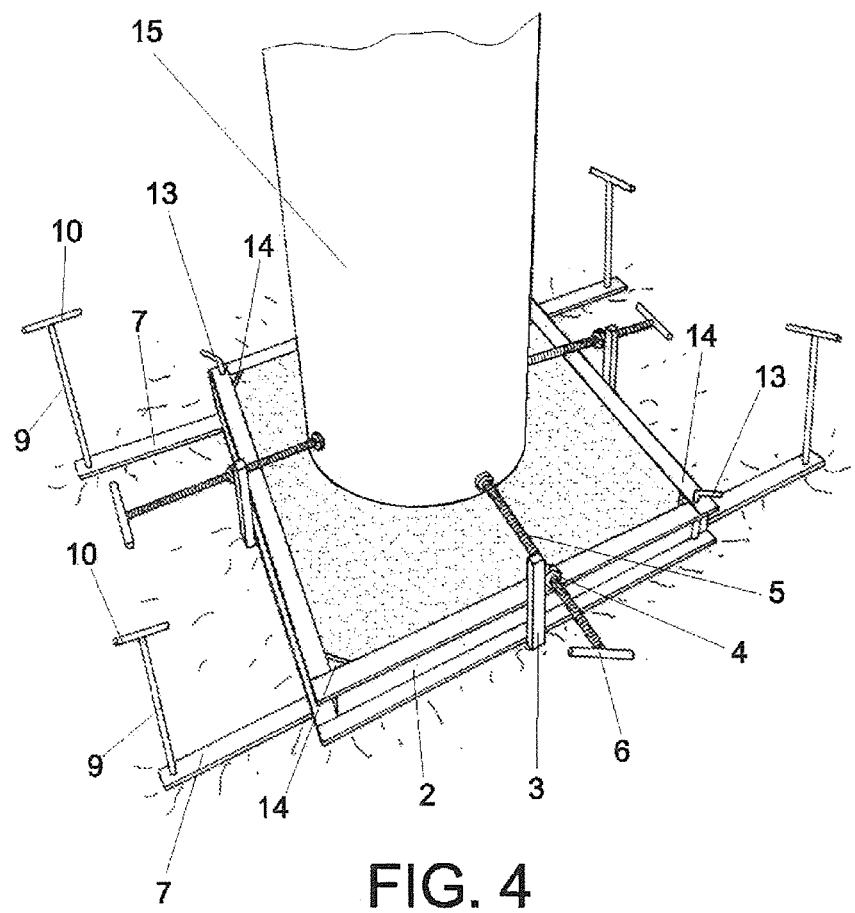
FIG. 4.— Shows a perspective view of the frame object of the invention once the trench has been filled with concrete, in which said frame acting as a formwork element is shown.

As it may be clearly appreciated in FIGS. 1, 2 and 3, these bolts (5) feature a manual tightening element (6) on their outer end, achieving with its rotation that the bolts (5) advance toward the pedestal (15) making contact with the latter. Rotation adjustment of the four bolts (5) against the pedestal (15) is carried out in such a way that a perfect vertical positioning of the pedestal (15) is achieved.

Furthermore, for a correct fixation of the frame to the ground, plates (7) are provided, which feature holes (8), as shown in FIGS. 1 and 2, and through which picks (9) are vertically inserted, designed to be nailed to the ground. Those plates (7) are linked on their lower section to two of the profiles (2) of the structure (1).

Likewise, as it may be appreciated in FIG. 2, the profiles (2) containing the plates (7) are placed facing each other, for better fixation to the ground. On the other hand, the picks (9) are provided with attachment elements (10) on their upper end for manual nailing to the ground.

In order to close the articulated structure (1) there are hollow tubes (11) welded to two of the profiles (2), with the other two remaining profiles (2) containing openings (12), which coincide with the said tubes (11) and through which latches (13) are vertically inserted featuring an inverted L-shape, as may be seen on FIG. 1.

The structure (1) further comprises joints (14), represented in all FIGS. 1-4, and placed on the interior sides of the profiles' (2) corners, which facilitate continuity among said profiles (2), softening the corners to eliminate in this way dangerous sharp edges once the concrete inside the frame has forged and dried.

The invention claimed is:

1. A frame for fixation and calibration of a pedestal, preferably a heliostat comprising:
    a quadrangular structure articulated in at least one of its corners and adapted to surround the pedestal and constituting a formwork element in the pedestal's foundation, for being filled with concrete;
    four horizontal profiles, provided in the quadrangular structure:
    calibration bolts for pressing and adjusting the pedestal in a vertical position;
    vertical bodies linked to the profiles;
    nuts connected to the vertical bodies for inserting the calibration bolts;
    plates linked to the profiles;
    holes located in the plates; and
    picks for being inserted through the holes, and for being nailed to the ground for fixation and stability of the frame.

2. The frame of claim 1, wherein the profiles display a U-shaped configuration with their branches pointing outwards.

3. The frame of claim 1, wherein the bolts feature a manual tightening element on their exterior end.

4. The frame of claim 1, further comprising:
    four plates, being two plates arranged in each of two profiles facing each other.

5. The frame of claim 1, wherein the picks feature attachment elements on their upper end for manual nailing to the ground.

6. The frame of claim 1, wherein the quadrangular structure is articulated in two of its corners.

7. The frame of claim 6, further comprising:
    hollow tubes welded to two of the profiles, with the remaining two profiles containing openings which coincide with the tubes, for vertically inserting latches through the openings in order to close the structure around the pedestal.

8. The frame of claim 1, further comprising joints located on the interior sides of he profile's corners, in order to eliminate sharp edges once the concrete has forged.

* * * * *

UNITED STATES PATENT AND TRADEMARK OFFICE
CERTIFICATE OF CORRECTION

| | |
|---|---|
| PATENT NO. | : 9,115,502 B2 |
| APPLICATION NO. | : 13/387351 |
| DATED | : August 25, 2015 |
| INVENTOR(S) | : Francisco Cerón García et al. |

It is certified that error appears in the above-identified patent and that said Letters Patent is hereby corrected as shown below:

In the Claims,

Column 4, Claim 8, line 38, please delete "he profile" and insert --the profile--

Signed and Sealed this
Fifteenth Day of March, 2016

Michelle K. Lee
*Director of the United States Patent and Trademark Office*